Patented Jan. 13, 1948

2,434,496

UNITED STATES PATENT OFFICE 2,434,496

LIGHT STABLE COMPOSITIONS COMPRISING POLYMERIC VINYLIDENE CHLORIDE OR VINYL CHLORIDE AND CERTAIN 5-SUBSTITUTED 2-HYDROXYBENZOPHENONES

Thomas Houtman, Jr., Midland, Mich., assignor to The Dow Chemical Company, Midland, Mich., a corporation of Delaware No Drawing. Application March 2, 1945, Serial No. 580,713

7 Claims. (Cl. 260—86)

This invention relates to compositions comprising polymeric compositions of improved light stability, and relates in particular to compositions comprising polymeric vinylidene chloride, polymeric vinyl chloride, and copolymers wherein these compounds are present in substantial amount. It has been recognized previously that the polymer of vinylidene chloride, the polymer of vinyl chloride, and copolymers containing either of these compounds are subject to a certain amount of darkening and decomposition when exposed for prolonged periods to the effects of light. These undesirable effects are particularly noticeable when dealing with the polymeric substances in a thin section, such as is found in films or filaments. Various protective agents have been proposed in the past to overcome this difficulty, but none of them has been as satisfactory as might be desired. About the best of the light stabilizers, heretofore proposed for vinylidene chloride polymers, has been the compound 2.2′-dihydroxy benzophenone. This compound has afforded maximum protection against the effects of light, but in stabilizing concentrations it contributes an undesirably high intensity of yellow color to the composition. It has the further disadvantage, from the commercial viewpoint, of being undesirably expensive. Salol and some of its derivatives have been used with the vinyl chloride polymers, but these compounds are not among the best light stabilizers for vinylidene chloride polymers.

It is accordingly among the objects of the present invention to provide a vinylidene chloride or a vinyl chloride polymer composition containing a light stabilizer which will afford maximum protection and, at the same time, will not contribute to the composition an undesirable amount of color. A related object is to provide such a composition which is stable both to the ultra violet light from artificial source and that contained in direct sunlight, so that the composition may be stable toward any light to which it may be subjected.

It has now been found that the foregoing and related objects may be attained through the use in the polymer composition of a particular type of benzophenone derivative which always has substituent groups in the 2,5-positions and which has the general formula:

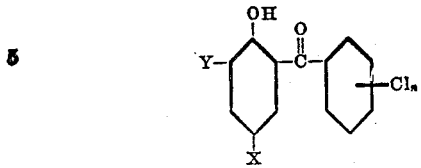

wherein X is a member of the class consisting of the methyl and ethyl radicals and chlorine; Y is a member of the class consisting of chlorine and hydrogen, and $n$ has a numerical value of from 0 to 2, inclusive. Specific examples of compounds falling within the above generic formula and which have all been found to be useful for the herein described purpose are: 2-hydroxy-5-chlorobenzophenone, 2-hydroxy-5.2′-dichlorobenzophenone, 2-hydroxy-5.3′.4′-trichlorobenzophenone, 2-hydroxy-3.5-dichlorobenzophenone, 2-hydroxy-3.5.2′-trichlorobenzophenone, 2-hydroxy-5-methyl benzophenone, 2-hydroxy-5-methyl-2′-chlorobenzophenone, 2-hydroxy-5-ethyl benzophenone. Methods whereby compounds of this type may be prepared are known in the prior art.

The above-identified benzophenone compounds may be employed as stabilizers in amounts which vary from about 0.5 up to about 10 per cent, based on the weight of the polymer or copolymer being treated. For most commercial applications, it has been found that from 1 to 5 per cent of the stabilizer compound is sufficient to provide the desired protection. It has also been found that in stabilizing quantities these compounds contribute less color to the polymeric composition than does the previously employed 2.2′-dihydroxy benzophenone.

The manner of adding the stabilizing agent to the polymeric composition is not critical to the present invention. Thus, the stabilizing agents may be dissolved or dispersed in an organic solvent or plasticizer and distributed throughout the polymer mass on compounding rolls, or the stabilizer may be added in powder form to the powdered polymer and distributed uniformly through the mass in any suitable blending device such as a ball mill or other available mixing apparatus.

Regardless of the manner in which the new stabilizers are added to the polymeric product, it has been found that they exhibit the desired stabilizing effect on the polymeric material when the latter has been fabricated and is exposed to light. While an untreated film or filament made from a vinylidene chloride polymer or from a vinyl chloride polymer may assume a dark brown or black color after prolonged exposure to sunlight or to ultra violet radiations from artificial sources, the compositions containing relatively small amounts of the new stabilizers, when exposed in the same manner and in the same physical form, have been found to resist discoloration for prolonged periods, which, in the case of sunlight exposure, have ranged up to several months.

The following examples illustrate the practice of the invention:

Example 1.—A copolymer of about 88 per cent vinylidene chloride and about 12 per cent vinyl chloride, in powder form, was compounded with the indicated stabilizer, which had in each case been dissolved in di-(alpha-phenylethyl) ether, in such amount as to provide 2 per cent of the stabilizer and about 7 per cent of the plasticizer, based on the weight of polymer. The so-formed composition was extruded in the form of films, which were drawn to a thickness of 0.002 inch. A portion of each film was exposed to ultra violet radiation in a fadeometer for 60 hours. After exposure, each sample was measured for light transmission, in comparison with unexposed samples of films of the same composition. The values are expressed in terms of the transmitted percentage of the available visible light, and comparisons are expressed as differences in the percentage of light transmitted before and after exposure. The smaller the change, as a result of exposure, the more effective is the stabilizer. The specimens marked "blank," consisted of films of the same polymer and plasticizer (the di-(alpha-phenylethyl) ether), but without any of the herein-claimed light stabilizers.

Table

| Added Agent | Per cent Visible Transmission | | |
|---|---|---|---|
| | Before | After | Loss |
| 2-Hydroxy-5-chlorobenzophenone | 83.9 | 80.6 | 3.3 |
| 2-Hydroxy-3.5-dichlorobenzophenone | 84.5 | 81.8 | 2.7 |
| 2-Hydroxy-5.3'.4'-trichlorobenzophenone | 84.8 | 82.2 | 2.6 |
| 2-Hydroxy-5-ethyl benzophenone | 84.5 | 81.8 | 2.7 |
| 2-Hydroxy-5-methyl benzophenone | 84.7 | 81.8 | 2.9 |
| 2-Hydroxy-5.2'-dichlorobenzophenone | 84.0 | 82.2 | 1.8 |
| 2-Hydroxy-3.5.2'-trichlorobenzophenone | 84.6 | 84.0 | 0.6 |
| 2-Hydroxy-5-methyl-2'-chlorobenzophenone | 84.5 | 78.8 | 5.7 |
| For Contrast | | | |
| Tertiary butyl salol | 83.5 | 71.2 | 12.3 |
| Salol | 84.3 | 56.8 | 27.5 |
| Blank | 82.0 | 58.7 | 23.3 |

Further tests were run on other samples of the same compositions by exposing them for two months on an unsheltered roof in the Florida sunshine. At the end of that period a visual observation was made of the samples, and the test was continued. The least affected samples, i. e., the ones showing maximum effectiveness of the stabilizers, were those containing 2-hydroxy-5-chlorobenzophenone and 2-hydroxy - 5 - methyl benzophenone. The next best, and only slightly discolored, samples were those containing 2-hydroxy-3.5-dichlorobenzophenone, 2 - hydroxy - 5 - ethyl benzophenone and 2-hydroxy-5-methyl-2'-chlorobenzophenone. All samples containing the new stabilizers were much improved over the untreated blank, which had acquired a decided brown coloration.

Example 2.—Two commercial samples of predominantly vinyl chloride polymers were obtained from different sources. These were each plasticized by addition of about 45 parts of tri-orthocresyl phosphate, by weight to each 55 parts of the vinyl chloride polymer. A portion of each plasticized mixture was thoroughly mixed with 2 per cent of its weight of 2-hydroxy-5-chlorobenzophenone. Molded discs 0.004 inch thick were prepared from the stabilized and unstabilized samples, and some of each type of disc were exposed in a fadeometer for 60 hours, while unexposed samples were reserved for comparison of light transmission values. The results are given below:

Table

| Added Agent | Per cent Visible Transmission | | |
|---|---|---|---|
| | Before | After | Loss |
| No. 1—Blank | 87.3 | 22.9 | 64.4 |
| No. 2—Blank | 87.2 | 19.5 | 67.7 |
| No. 1 plus stabilizer | 87.0 | 84.5 | 2.5 |
| No. 2 plus stabilizer | 86.8 | 84.4 | 2.4 |

It is to be understood that the invention is not limited to its use in connection with the copolymers of the preceding examples, and that the new stabilizers are found to afford protection to polyvinylidene chloride and to any polymer in which either vinylidene chloride or vinyl chloride is present in substantial amount (over 10 per cent), and particularly those in which either vinylidene chloride or vinyl chloride predominates, including, for example, such copolymers containing acrylonitrile, ethyl acrylate, methyl methacrylate, vinyl acetate, styrene, butadiene, or similar copolymerized ingredients, or mixtures thereof. It is particularly effective with the binary copolymers of vinylidene chloride and vinyl chloride in all proportions.

Since light stability in a polymer may be attained through proper protection of exposed surfaces thereof, it is evident that the stabilizer need not be present throughout the polymeric body if it is present in stabilizing quantities in the surface layers, and that protection may be attained by coating a polymeric vinylidene chloride article or a polymeric vinyl chloride article with a lacquer containing the stabilizer. Such lacquer will preferably, but not necessarily, comprise a soluble vinylidene chloride or vinyl chloride copolymer as the film forming base.

Stabilizing quantities of the new agents have been suggested as varying from 0.5 to 10 per cent of the weight of the treated polymer. Ordinarily from 1 to 5 per cent is used, and in most cases 2 per cent of stabilizer is adequate. It has been found, however, that the present stabilizers also act as plasticizers when employed in higher concentrations, and it is to be understood that such use is contemplated as part of the invention as well as the use of merely stabilizing concentrations.

I claim:

1. A composition of matter comprising a polymer in which at least one polymerized ingredient present in amount over 10 per cent is selected from the class consisting of vinylidene chloride and vinyl chloride, and from 0.5 to 10 per cent of a compound having the general formula

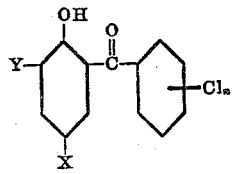

wherein X is a member of the class consisting of methyl and ethyl radicals and chlorine, Y is a member of the class consisting of chlorine and hydrogen, and $n$ has a numerical value from 0 to 2, inclusive, to stabilize the polymer against the injurious effects of light.

2. The composition as claimed in claim 1, wherein the stabilizer is present in an amount between 1 and 5 per cent of the weight of the polymer.

3. The composition as claimed in claim 1, wherein the polymer is a copolymer of vinylidene chloride and vinyl chloride.

4. The composition claimed in claim 1, in which the stabilizer is 2-hydroxy-5-chlorobenzophenone.

5. The composition claimed in claim 1, in which the stabilizer is 2-hydroxy-5-methyl benzophenone.

6. The composition claimed in claim 1, in which the stabilizer is 2-hydroxy-3,5-dichlorobenzophenone.

7. A copolymer of vinylidene chloride and vinyl chloride, stabilized against the injurious effects of light with from 0.5 to 10 per cent of its weight of 2-hydroxy-5-chlorobenzophenone.

THOMAS HOUTMAN, JR.

REFERENCES CITED

The following references are of record in the file of this patent:

UNITED STATES PATENTS

| Number | Name | Date |
|---|---|---|
| 2,264,291 | Boyer et al. | Dec. 2, 1941 |